United States Patent
Liu et al.

(10) Patent No.: US 10,869,031 B2
(45) Date of Patent: Dec. 15, 2020

(54) METHOD OF INTRA BLOCK COPY SEARCH AND COMPENSATION RANGE

(71) Applicant: HFI Innovation Inc., Zhubei (TW)

(72) Inventors: Shan Liu, San Jose, CA (US);
Wang-Lin Lai, San Jose, CA (US);
Tzu-Der Chuang, Zhubei (TW);
Ching-Yeh Chen, Taipei (TW);
Yu-Wen Huang, Taipei (TW);
Chih-Wei Hsu, Taipei (TW);
Xiaozhong Xu, Fremont, CA (US)

(73) Assignee: HFI Innovation Inc., Zhubei (TW)

( * ) Notice: Subject to any disclaimer, the term of this patent is extended or adjusted under 35 U.S.C. 154(b) by 335 days.

(21) Appl. No.: 15/318,428

(22) PCT Filed: Jul. 7, 2015

(86) PCT No.: PCT/CN2015/083443
§ 371 (c)(1),
(2) Date: Dec. 13, 2016

(87) PCT Pub. No.: WO2016/004850
PCT Pub. Date: Jan. 14, 2016

(65) Prior Publication Data
US 2017/0134724 A1 May 11, 2017

Related U.S. Application Data

(60) Provisional application No. 62/094,140, filed on Dec. 19, 2014, provisional application No. 62/045,620,
(Continued)

(51) Int. Cl.
*H04N 19/00* (2014.01)
*H04N 19/105* (2014.01)
(Continued)

(52) U.S. Cl.
CPC ............ *H04N 19/105* (2014.11); *H04N 19/11* (2014.11); *H04N 19/13* (2014.11); *H04N 19/159* (2014.11);
(Continued)

(58) Field of Classification Search
CPC .... H04N 19/51; H04N 19/583; H04N 19/105; H04N 19/11; H04N 19/13; H04N 19/159;
(Continued)

(56) References Cited

U.S. PATENT DOCUMENTS

2009/0290643 A1* 11/2009 Yang .................... H04N 19/597
375/240.16
2010/0266042 A1* 10/2010 Koo ..................... H04N 19/597
375/240.16
(Continued)

FOREIGN PATENT DOCUMENTS

CN 103873861 6/2014
JP 2000-041243 A 2/2000
(Continued)

OTHER PUBLICATIONS

Kwon, et al. Fast Intra Block Copy (IntraBC) search for HEVC screen content coding, Jun. 1-5, 2014, IEEE International Symposium on Circuits and Systems (ISCAS), Melbourne VIC, 2014, pp. 9-12.*
(Continued)

*Primary Examiner* — Frank F Huang
(74) *Attorney, Agent, or Firm* — Oblon, McClelland, Maier & Neustadt, L.L.P.

(57) ABSTRACT

A method of IntraBC coding using restricted reference area is disclosed. A reference block is selected from an available ladder-shaped reference area comprising previously processed blocks before the current working block in the current CTU row and previously processed blocks in one or
(Continued)

more previous CTU rows. A location of a last previously processed block of a second previous CTU row that is one CTU row farther away from the current CTU row than a first previous CTU row is always in a same vertical location or after a same vertical position of a last previously processed block of the first previous CTU row. The current picture may be partitioned into multiple CTU rows for applying wavefront parallel processing (WPP) on the multiple CTU rows, where the current working block corresponds to a current working block. Similar restrictions may also be applied to slice/tile-based parallel processing.

14 Claims, 13 Drawing Sheets

Related U.S. Application Data filed on Sep. 4, 2014, provisional application No. 62/025,122, filed on Jul. 16, 2014, provisional application No. 62/021,291, filed on Jul. 7, 2014.

(51) Int. Cl.

| | | |
|---|---|---|
| *H04N 19/436* | (2014.01) | |
| *H04N 19/176* | (2014.01) | |
| *H04N 19/70* | (2014.01) | |
| *H04N 19/11* | (2014.01) | |
| *H04N 19/174* | (2014.01) | |
| *H04N 19/13* | (2014.01) | |
| *H04N 19/159* | (2014.01) | |
| *H04N 19/513* | (2014.01) | |
| *H04N 19/172* | (2014.01) | |

(52) U.S. Cl.
CPC ......... *H04N 19/174* (2014.11); *H04N 19/176* (2014.11); *H04N 19/436* (2014.11); *H04N 19/513* (2014.11); *H04N 19/70* (2014.11); *H04N 19/172* (2014.11)

(58) Field of Classification Search
CPC .. H04N 19/174; H04N 19/176; H04N 19/436; H04N 19/513; H04N 19/70; H04N 19/172; H04N 19/52
See application file for complete search history.

(56) References Cited

U.S. PATENT DOCUMENTS

| | | | |
|---|---|---|---|
| 2013/0229485 A1* | 9/2013 | Rusanovskyy | H04N 19/597 348/43 |
| 2014/0003531 A1 | 1/2014 | Coban et al. | |
| 2014/0169472 A1 | 6/2014 | Fludkov et al. | |
| 2015/0049813 A1* | 2/2015 | Tabatabai | H04N 19/513 375/240.16 |
| 2015/0312545 A1* | 10/2015 | Xu | H04N 19/597 348/43 |
| 2016/0105682 A1* | 4/2016 | Rapaka | H04N 19/44 375/240.12 |
| 2016/0241868 A1 | 8/2016 | Li et al. | |

FOREIGN PATENT DOCUMENTS

| | | |
|---|---|---|
| JP | 2014-011726 A | 1/2014 |
| JP | 2016539542 A | 12/2016 |
| WO | WO 2015/054811 A1 | 4/2015 |

OTHER PUBLICATIONS

International Search Report dated Sep. 28, 2015, issued in application No. PCT/CN2015/083443.
Chen, J., et al.; "Description of screen content coding technology proposal by Qualcomm;" Joint Collaborative Team on Video Coding (JCT-VC) of ITU-T SG16 WP3 and ISO/IEC JTC1/SC29/WG11; JCTVC-Q0031; Apr. 2014; pp. 1-19.
Lai, P.L., et al.; "Description of screen content coding technology proposal by MediaTek;" Joint Collaborative Team on Video Coding (JCT-VC) of ITU-T SG16 WP3 and ISO/IEC JTC1/SC29/WG11; Mar.-Apr. 2014; pp. 1-32.
Balle, J., et al.; "Extended Texture Prediction for H.264/AVC Intra Coding;" IEEE; Sep. 2007; pp. VI-93-V1-96.
Clare, G., et al.; "Wavefront Parallel Processing for HEVC Encoding and Decoding;" Joint Collaborative Team on Video Coding (JCT-VC) of ITU-T SG16 WP3 and ISO/IEC JTC1/SC29/WG11; Jul. 2011; pp. 1-16.
Laroche, G., et al.; "AHG14: On IBC constraint for wavefront Parallel Processing;" Joint Collaborative Team on Video Coding (JCT-VC) of ITU-T SG 16 WP 3 and ISO/IEC JTC 1/SC 29/WG 11; Oct. 2014; pp. 1-6.
Flynn, D., et al.; "BoG Report on Range Extensions topics;" Joint Collaborative Team on Video Coding (JCT-VC) of ITU-T SG 16 WP 3 and ISO/IEC JTC 1/SC 29/WG 11; Oct.-Nov. 2013; pp. 1-43.
Li, B, et al.; "On Intra BC mode;" Joint Collaborative Team on Video Coding (JCT-VC) of ITU-T SG 16 WP 3 and ISO/IEC JTC 1/SC 29/WG 11; Oct.-Nov. 2013; pp. 1-12.
Li, B, et al.; "On Intra BC mode;" Joint Collaborative Team on Video Coding (JCT-VC) of ITU-T SG 16 WP 3 and ISO/IEC JTC 1/SC 29/WG 11; Oct.-Nov. 2013; pp. 1-14.
Sullivan, G., et al.; "Meeting report of the 17th meeting of the Joint Collaborative Team on Video Coding (JCT-VC);" Joint Collaborative Team on Video Coding (JCT-VC) of ITU-T SG 16 WP 3 and ISO/IEC JTC 1/SC 29/WG 11; Mar.-Apr. 2014; pp. 1-141.
Coban, M., et al.; "On tiles and wavefront parallel processing;" Joint Collaborative Team on Video Coding (JCT-VC) of ITU-TSG 16 WP 3 and ISO/IEC JTC 1/SC 29/WG 11; Jul. 2012; pp. 1-6.
E. Alshina, A. Alshin and S. Lee,AhG5: Intra block copy within one LCU,Joint Collaborative Team on Video Coding (JCT / VC) of ITU-T SG 16 WP 3 and ISO/IEC JTC 1/SC 29/WG 11, 15th Meeting: Geneva, CH,2013. JCTSC-O0074_r3, pp. 1-7.
Sunil Lee, Elena Alshina adn Changyul Kim, AHG5: Extens ion of intra block copy and Joint Collaborative Team on Video Coding (JCT-VC) of ITU-TSG 16 WP 3 and ISO/IEC JTC 1/SC 29/WG 11, and 15th Meeting: Geneva, CH, Oct. 2013 and JCTVC-O0112_r2 and pp. 1-8.
Japanese Office Action dated Jan. 7, 2010 in Japanese Patent Application No. 2019-002881, with English translation.

* cited by examiner

| | LCU-TL | LCU-T | LCU-TR | LCU-TR2 |
|---|---|---|---|---|
| LCU-L2 | LCU-L | LCU-C | | |

| 0 | 1 | 2 | 3 | 12 | 13 | 14 | 21 | 22 | 23 | 24 |
|---|---|---|---|---|---|---|---|---|---|---|
| 4 | 5 | 6 | 7 | 15 | 16 | 17 | 25 | 26 | 27 | 28 |
| 8 | 9 | 10 | 11 | 18 | 19 | 20 | 29 | 30 | 31 | 32 |
| 33 | 34 | 35 | 36 | 41 | 42 | 43 | 47 | 48 | 49 | 50 |
| 37 | 38 | 39 | 40 | 44 | 45 | 46 | 51 | 52 | 53 | 54 |
| 55 | 56 | 57 | 58 | 63 | 64 | 65 | 69 | 70 | 71 | 72 |
| 59 | 60 | 61 | 62 | 66 | 67 | 68 | 73 | 74 | 75 | 76 |

METHOD OF INTRA BLOCK COPY SEARCH AND COMPENSATION RANGE

CROSS REFERENCE TO RELATED APPLICATIONS

The present invention claims priority to U.S. Provisional Patent Application, Ser. No. 62/021,291, filed on Jul. 7, 2014, U.S. Provisional Patent Application, Ser. No. 62/025,122, filed on Jul. 16, 2014, U.S. Provisional Patent Application, Ser. No. 62/094,140, filed on Dec. 19, 2014, and U.S. Provisional Patent Application, Ser. No. 62/045,620, filed on Sep., 4, 2014. The U.S. Provisional Patent Applications are hereby incorporated by reference in their entireties.

TECHNICAL FIELD

The present invention relates to video coding using Intra-block copy (IntraBC) mode for screen content coding or video coding. In particular, the present invention relates to techniques to support slice/tile-based parallel processing or wavefront parallel processing when the Intra-block copy (IntraBC) coding mode is selected.

BACKGROUND

In the current development of range extension (RExt) or screen content coding for High Efficiency Video Coding (HEVC) standard, some tools aiming at providing solutions for efficiently compressing video contents of higher bit-depths (e.g., 10, 12, 14 and 16) and other than YUV420 color format (E.G., YU422, YUV444 and RGB444) have been developed to improve coding efficiency for THESE contents. For Intra blocks, Intra prediction according to the conventional approach is performed using prediction based on reconstructed pixels from neighboring blocks. Intra prediction may select an Intra Mode from a set of Intra Modes, which include a vertical mode, horizontal mode and various angular prediction modes. For HEVC Range Extension and screen content coding, a new coding mode, named Intra-block copy (IntraBC) has been used. The IntraBC technique that was originally proposed by Budagavi in *AHG8: Video coding using Intra motion compensation*, Joint Collaborative Team on Video Coding (JCT-VC) of ITU-T SG16 WP3 and ISO/IEC JTC1/SC29/WG11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named motion vector (MV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transform (such as discrete cosine transform (DCT)).

In JCTVC-M0350, the Intra MC is different from the motion compensation used for Inter prediction in at least the following areas:
- MVs are restricted to be 1-D for Intra MC (i.e., either horizontal or vertical) while Inter prediction uses 2-D motion estimation.
- Binarization is fixed length for Intra MC while Inter prediction uses exponential-Golomb.
- Intra MC introduces a new syntax element to signal whether the MV is horizontal or vertical.

Based on JCTVC-M0350, some modifications are disclosed by Pang, et al. in *Non-RCE3: Intra Motion Compensation with 2-D MVs*, Joint Collaborative Team on Video Coding (JCT-VC) of ITU-T SG16 WP3 and ISO/IEC JTC1/SC29/WG11, 14th Meeting: Vienna, AT, 25 Jul.-2 Aug. 2013, Document: JCTVC-N0256 (hereinafter JCTVC-N0256). Firstly, the Intra MC is extended to support 2-D MVs, so that both MV components can be non-zero at the same time. This provides more flexibility to Intra MC than the original approach, where the MV is restricted to be strictly horizontal or vertical.

In JCTVC-N0256, two MV coding methods were disclosed:
- Method 1—Motion vector prediction. The left or above MV is selected as the MV predictor and the resulting motion vector difference (MVD) is coded. A flag is used to indicate whether the MVD is zero. When MVD is not zero, exponential-Golomb codes of the 3rd order are used to code the remaining absolute level of the MVD. Another flag is used to code the sign.
- Method 2: No Motion vector prediction. The MV is coded using the exponential-Golomb codes that are used for MVD in HEVC.

Another difference disclosed in JCTVC-N0256 is that the 2-D Intra MC is further combined with the pipeline friendly approach:
1. No interpolation filters are used,
2. MV search area is restricted. Two cases are disclosed:
    a. Search area is the current CTU and the left CTU or
    b. Search area is the current CTU and the rightmost 4 column samples of the left CTU.

Among the proposed methods in JCTVC-N0256, the 2-D Intra MC, the removal of interpolation filters, and the search area constraint to the current CTU and the left CTU have been adopted in a new version draft standard.

In more recent development under Joint Collaborative Team on Video Coding (JCT-VC), full-frame IntraBC has been disclosed in JCTVC-Q0031 (Chen et al., *Description of screen content coding technology proposal by Qualcomm*, Joint Collaborative Team on Video Coding (JCT-VC) of ITU-T SG16 WP3 and ISO/IEC JTC1/SC29/WG11, 17th Meeting: Valencia, ES, 27 Mar.-4 Apr. 2014, Document: JCTVC-Q0031) and JCTVC-Q0035 (Li et al., *Description of screen content coding technology proposal by Microsoft*, Joint Collaborative Team on Video Coding (JCT-VC) of ITU-T SG16 WP3 and ISO/IEC JTC1/SC29/WG11, 17th Meeting: Valencia, ES, 27 Mar.-4 Apr. 2014, Document: JCTVC-Q0035). Full-frame IntraBC removes the search area constraints to further improve the coding efficiency of IntraBC. In other words, all of the coded blocks can be referenced by the current CU, which introduces the data dependency between the current CU and all of previous coded CUs. Although full-frame IntraBC outperforms the original IntraBC, this data dependency prevents parallel processing when decoding one picture, especially for enabling tile process or wavefront parallel process (WPP) in HEVC.

The parallelism according to the WPP is illustrated in FIG. 2, where the video blocks in a picture are processed row by row. In order to allow two rows processed in parallel, each row starts two blocks later than its above row. As a result, the blocks denoted as "curr. CTU 0", "curr. CTU 1", "curr. CTU 2" and "curr. CTU 3" are the currently processed blocks in various CTU rows. These currently processed blocks can be processed concurrently. The blocks to the left of each current block in the same row are already processed. In HEVC, such parallelization strategy is called "wavefront parallel processing" (WPP). These currently processed blocks are referred to as "wavefronts" in this disclosure. To support the WPP in the full-frame IntraBC, the current IntraBC coded block (e.g., current CTU) cannot refer to any reference in regions that are not yet processed.

Therefore, it is desirable to develop methods to remove or reduce the data dependency in full-frame IntraBC mode to allow the parallel processing of tile and WPP.

In SCM-2.0 (Joshi et al., *Screen content coding test model 2* (*SCM 2*), Joint Collaborative Team on Video Coding (JCT-VC) of ITU-T SG 16 WP3 and ISO/IEC JTC 1/SC29/WG11, 18th Meeting: Sapporo, JP, 30 Jun.-9 Jul. 2014, Document: JCTVC-R1014), the block vector (BV) coding is modified to use the neighboring BVs and coded BVs as BV predictor (BVP) according to JCTVC-R0309 (Pang, et al., *Non-SCCE*1: *Combination of JCTVC-R*0185 *and JCTVC-R*0203, Joint Collaborative Team on Video Coding (JCT-VC) of ITU-T SG 16 WP3 and ISO/IEC JTC 1/SC29/WG11, 18th Meeting: Sapporo, JP, 30 Jun.-9 Jul. 2014, Document: JCTVC-R0309). The BV predictor is derived in a way similar to the advanced motion vector prediction (AMVP) scheme in HEVC. A predictor candidate list is constructed by first checking the BV availability at spatial neighboring blocks a1 and b1 according to a priority order as shown in FIG. 3. If neither of the spatial neighbors contains block vectors, the last two coded BVs are used to fill the block vector candidate list so that the list will contain two different entries. The last two coded BVs are initialized with (−2*CU_width, 0) and (−CU_width, 0). In order to avoid the need of a line buffer to store the previously coded BVs, any of the spatial neighboring blocks a1 and b1 and the last BVs outside the current CTU is considered unavailable. The last two coded BVs are reset to (0, 0) for each CTU to prevent the data dependency.

Also, in HEVC, merge candidates are derived from spatial/temporal neighbor blocks for the current coded block in Inter coded slice. A merge_flag is used to signal whether the current block is merged into one of its candidates. If yes, another index is used to signal which of the candidates is used for Merge mode. For example, if candidate block a1 in FIG. 3 is signaled as the candidate to be used, then the current block will share the same motion vector and reference picture as those in block a1.

When some of the Merge candidates are not available (e.g., non-existing or non-Inter mode), additional candidates are inserted. If the Merge candidate list is still not full after inserting the additional candidates, a zero motion vector with refIdx (i.e., reference picture index) equal to 0 will be used to fill all the empty candidates.

Two types of additional candidates can be inserted.
1. Combined bi-predictive Merge candidate (candidate type 1), and
2. Zero vector Merge/AMVP candidate (candidate type 2).

The type-2 additional candidates are inserted after the type-1 additional candidates. In candidate type 1, combined bi-predictive Merge candidates are generated by combining original Merge candidate. In particular, two of the original candidates with mvL0 and refIdxL0, or with mvL1 and refIdxL1 are used to generate bi-predictive Merge candidates. The mvL0 represents the motion vector in list 0 and refIdxL0 represents the reference picture index in list 0. Similarly, with mvL1 represents the motion vector in list 1 and refIdxL1 represents the reference picture index in list 1.

In candidate type 2, zero vector Merge/AMVP candidates are generated by combining zero vectors and reference index which can be referred. If zero vector candidates are not duplicated, it is added to the Merge/AMVP candidate set.

While the full-frame IntraBC mode can improve the performance substantially, it may present a problem to the slice/tile-based parallel processing or wavefront parallel processing since the reference block for a currently processed block may not be available. Therefore, it is desirable to develop a method to overcome the issue related to unavailable reference data.

SUMMARY

A method of video coding using IntraBC mode (Intra-block copy mode) coding for a picture in a video coding system according to the present invention is disclosed. If the IntraBC mode (Intra-block copy mode) is selected for a current working block in a current processing area, a reference block from an available ladder-shaped reference area comprising one or more previously processed blocks before the current working block in the current processing area and one or more previously processed blocks before respective previous working blocks in one or more previously processing areas. The location of a previous working block of a second previous CTU row that is one CTU row farther away from the current CTU row than a first previous CTU row is always in a same vertical location or a vertical-right position of the previous working block of the first previous CTU row. The location of the previous working block of the previous CTU row above the current CTU row is always in the same vertical location or the vertical-right position of the current working block. Therefore, the available reference area forms a ladder-shaped area. The current working block is encoded or decoded according to the IntraBC mode using the reference block as a predictor. Each block may correspond to a coding unit (CU) and each processing area may correspond to a CTU row.

The location of the reference block relative to the current working block can be signaled using a block vector (BV) in the encoder side so that a decoder can use the BV to locate the reference block. The available ladder-shaped reference area may include all previously processed blocks from the beginning to the last previously processed block before the current working block in the current processing area. The available ladder-shaped reference area may also include all previously processed blocks from the beginning to the last previously processed blocks before one or more respective previous working blocks in the one or more previously processing areas.

Various available ladder-shaped reference areas are disclosed in various embodiments of the present invention. For example, the available ladder-shaped reference area for the current working block (x_cur, y_cur) may comprise previously processed blocks at (x_ref, y_ref), where (x_ref, y_ref) satisfies one of the following conditions:

$x\_ref < x\_cur$ and $y\_ref \leq y\_cur$; and $x\_cur \leq x\_ref \leq (x\_cur + N \times (y\_cur - y\_ref))$ and $y\_ref < y\_cur$, where N is equal to one.

The current picture may be partitioned into multiple CTU rows for applying wavefront parallel processing (WPP) on the multiple CTU rows and the current working block corresponds to a current working block and each previous working block corresponds to each previous wavefront block. In a decoder side, the video bitstream associated with the multiple CTU rows corresponds to multiple WPP sub-bitstreams and each WPP sub-bitstream is associated with each CTU row.

A method of video coding using slice-based or tile-based parallel processing for a picture is also disclosed. If the IntraBC mode (Intra-block copy mode) is selected for a current block in a current slice or a current tile, a reference block from a selected available reference area comprising one or more previously processed blocks before the current block in the current slice or the current tile is selected. The current block is encoded or decoded according to the IntraBC mode using the reference block as a predictor. The location of the reference block relative to the current block can be signaled using a block vector (BV) in the encoder side so that the decoder can determine the location of the reference block based on the BV.

If any portion of the reference block pointed by the BV is located outside the current slice or the current tile, the BV is clipped to a clipped BV so that a modified reference block pointed by the clipped BV is located entirely within the current slice or the current tile. For tile-based parallel processing, the BV clipping can be applied vertically first and then horizontally. Also, the BV clipping may also applied horizontally first and then vertically. For slice-based parallel processing, the vertical BV clipping can be applied.

Another aspect of the present invention addresses handling the cases when one or more samples of the reference block are not available. In one embodiment, one or more padded samples from neighboring available samples are used to replace one or more unavailable samples of the reference block. In another embodiment, the unavailable samples or an entire reference block is replaced by a pre-defined value, such as 128. In yet another embodiment, the reconstructed samples for the current picture are initialized to the pre-defined value before decoding process starts for the current picture, and if one or more samples of the reference block are not available, said one or more samples of the reference block will have the pre-defined value. The pre-defined value can be selected from a list of major colors signaled in a high level of the video bitstream, such as a slice level, a picture level or a sequence level. The list of major colors can be signaled using a number, N corresponding to the size of the list of major colors and followed by N major color values.

When one or more samples of the reference block are not available and the current block is in an Inter-slice, the unavailable samples or the entire reference block can be replaced by temporal reference samples from a temporal reference block collocated with the current block. Alternatively, the unavailable samples or the entire reference block can be replaced by temporal reference samples from a temporal reference block collocated with the reference block.

DETAILED DESCRIPTION

As mentioned above, the full-frame IntraBC (Intra block copy) mode can substantially improve the performance. However, the full-frame IntraBC mode cannot support parallel processing such as wavefront parallel processing (WPP) or slice/tile-based parallel processing. In order to take advantage of the improved performance due to extended search range of the full-frame IntraBC mode while supporting various parallel processing, the present invention discloses a method to restrict the search range to previously processed blocks or uses replacement data if any sample of the previously processed blocks is unavailable.

IntraBC for WPP-Based Process

Figure 1:
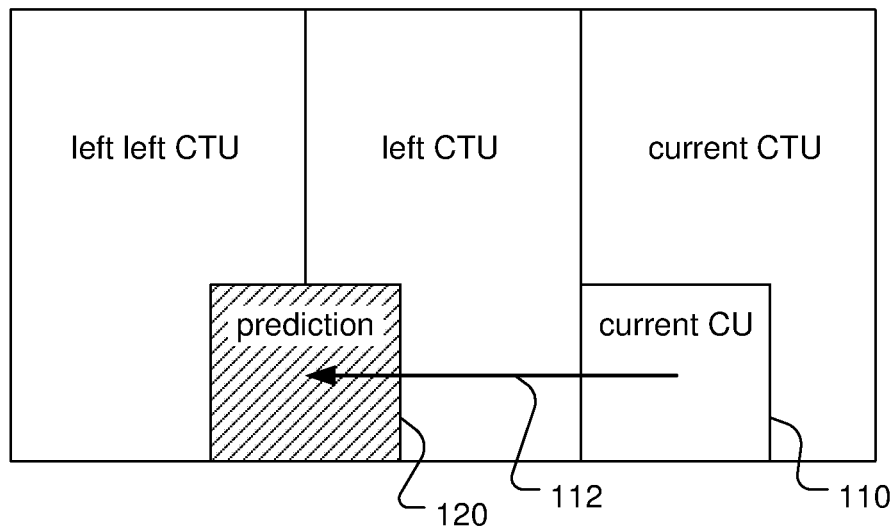
FIG. 1 illustrates an example of Intra motion compensation according to the Intra-block copy (IntraBC) mode, where a horizontal displacement vector is used.
Figure 2:
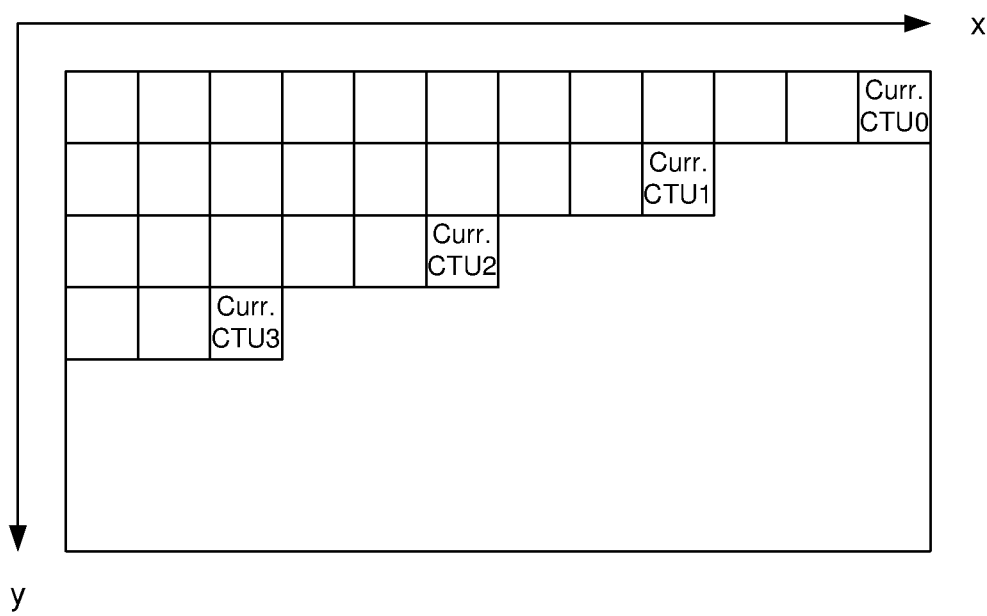
FIG. 2 illustrates an example of the parallelism of the WPP (wavefront parallel processing) according to HEVC (high efficiency video coding), where the video blocks in a picture are processed row by row.
Figures 3, 4:
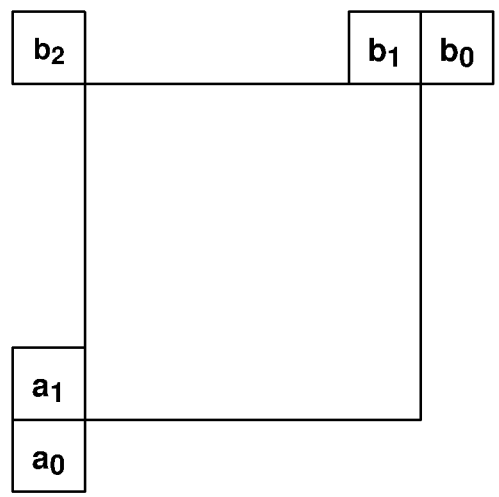
FIG. 3 illustrates an example of predictor candidate list that is constructed by first checking the BV availability at spatial neighboring blocks a1 and b1 according to a priority order.
FIG. 4 illustrates the data dependency that only exists between current CU and the neighboring CUs, including LCU-T, LCU-L, LCU-TR, and LCU-TL according to the WPP (wavefront parallel processing) of HEVC (high efficiency video coding).

As mentioned earlier, wavefront parallel process (WPP) is a method to achieve parallel processing for HEVC. In the WPP, the bitstream of each LCU row can be parsed independently after finishing the parsing process of the first two LCUs in the last LCU row. During the reconstruction stage, the data dependency only exists between current CU and the neighboring CUs, including LCU-T, LCU-L, LCU-TR, and LCU-TL, as shown in FIG. 4. After the top-right LCU in the last LCU row (i.e., LCU-TR in FIG. 4) is decoded, the current LCU can be decoded without the need to wait for the completion of the reconstruction process of the previous LCU rows. Therefore, different LCU rows can be decoded simultaneously with some necessary latency. On the other hand, the conventional full-frame IntraBC introduces the data dependency between the current CU and previous coded CUs, which prohibits parallel process in WPP.

Figure 5A:
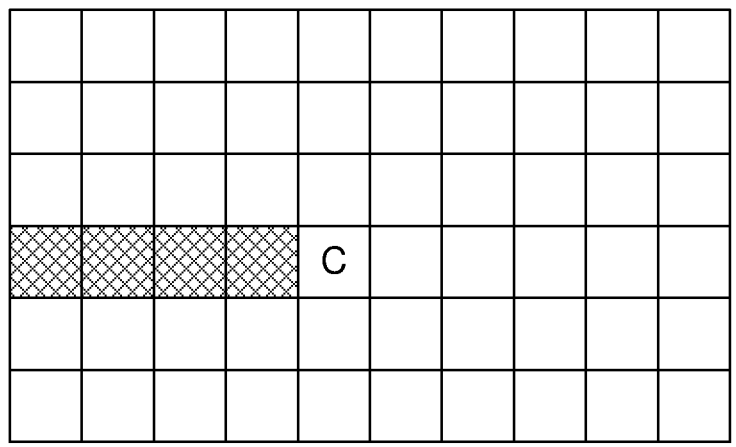
FIG. 5A-FIG. 5C illustrate examples of the available reference area, where the current LCU is indicated by a letter "C" and the available reference area for the current LCU are indicated by the line-filled area.
Figure 5B:
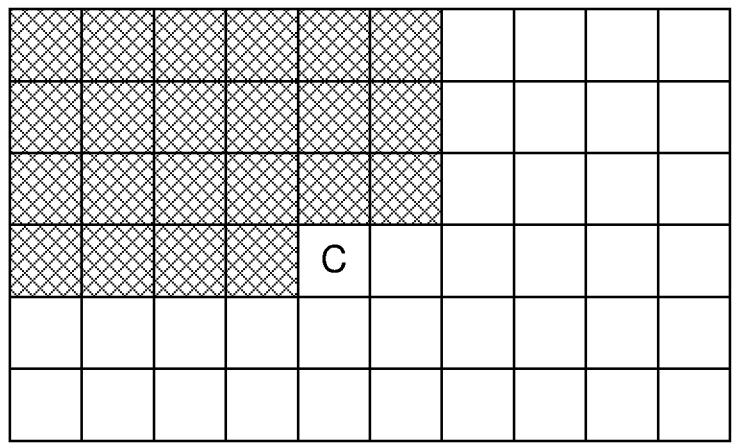
Figure 5C:
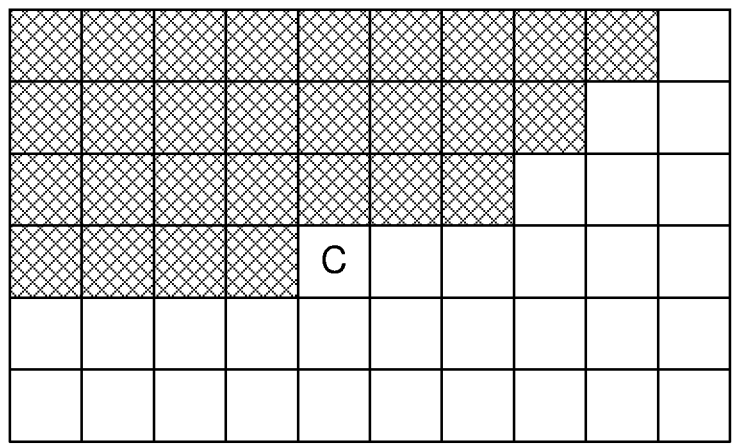

In order to achieve the parallel process in WPP, three examples of available reference area constraints for full-frame IntraBC process are disclosed. The available reference area is also referred to as available ladder-shaped reference area or search and compensation range in the following descriptions. According to the first example of available reference area constraint, only the area in the same LCU rows can be referenced for the IntraBC process when the WPP is enabled. The first example is illustrated in FIG. 5A, where the current LCU is indicated by a letter "C" and the available reference area for current LCU is indicated by the line-filled area. According to the second example of available reference area constraint, only the LCUs in the top-left area and one LCU column that LCU-TR belongs to can be referenced in the IntraBC process, as shown in FIG. 5B. According to the third example of available reference area constraint, the available reference area is increased according to the distance between current LCU row and the reference LCU row as shown in FIG. 5C.

Figure 6A:
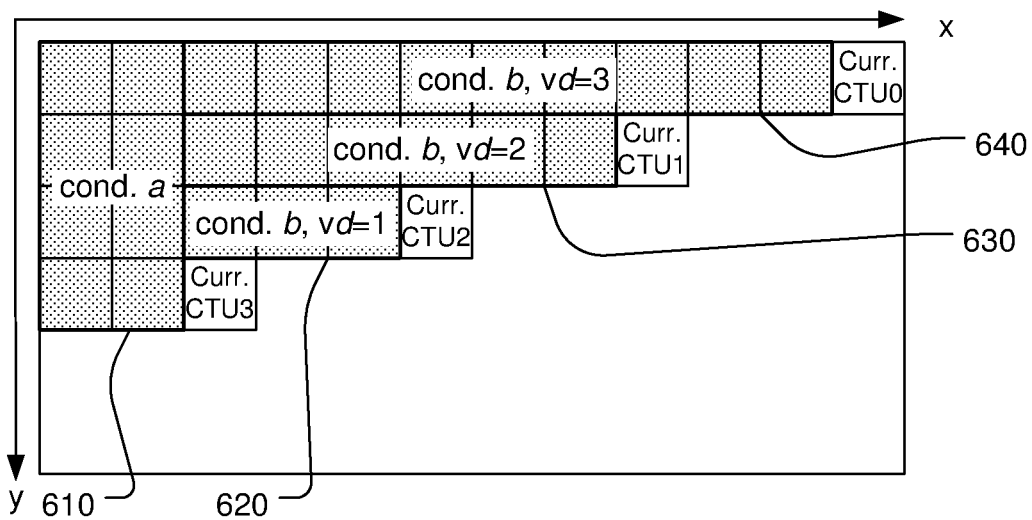
FIG. 6A-FIG. 6F illustrate examples of search and compensation ranges of the current IntraBC block restricted to the dot-filled areas under various constraints.

A systematic approach to specify the constraints on the search and compensation range for IntraBC process is disclosed as follows. An exemplary search and compensation range of the current IntraBC block is restricted to the dot-filled area as shown in FIG. 6A for the current CTU3 (i.e., "Curr. CTU3" in FIG. 6A). The current IntraBC block is also referred to as current IntraBC coded block, current video block or current working block in the following descriptions. The position of the current video block or the position of the CTU that contains the current video block is denoted as (x_cur, y_cur). The position of a video block (or CTU in the HEVC context) being referred as a reference blocks is denoted as (x_ref, y_ref). The search and compensation range of the current IntraBC coded block according to this embodiment is restricted to one of the following conditions:

$x\_ref < x\_cur$ and $y\_ref \leq y\_cur$, and     a.

$x\_cur \leq x\_ref < (x\_cur + N \times (y\_cur - y\_ref))$ and
$y\_ref < y\_cur$.     b.

N can be any positive integer number greater than or equal to 1. In the example shown in FIG. 6A, N is equal to 3. Condition a corresponds to the reference blocks shown as dot-filled area 610. Condition b corresponds to a reference area dependent on the vertical distance, vd (i.e., vd=(y_cur−y_ref)). Condition b with vd=1 corresponds to the reference blocks shown as dot-filled area 620. Condition b with vd=2 corresponds to the reference blocks shown as dot-filled area 630. Condition b with vd=3 corresponds to the reference blocks shown as dot-filled area 640. The constraints are applied to both encoder and decoder. It may also constrain the range of block vectors (BVs) since the information related to BVs may be signaled to indicate the location of the reference blocks.

Figure 6B:
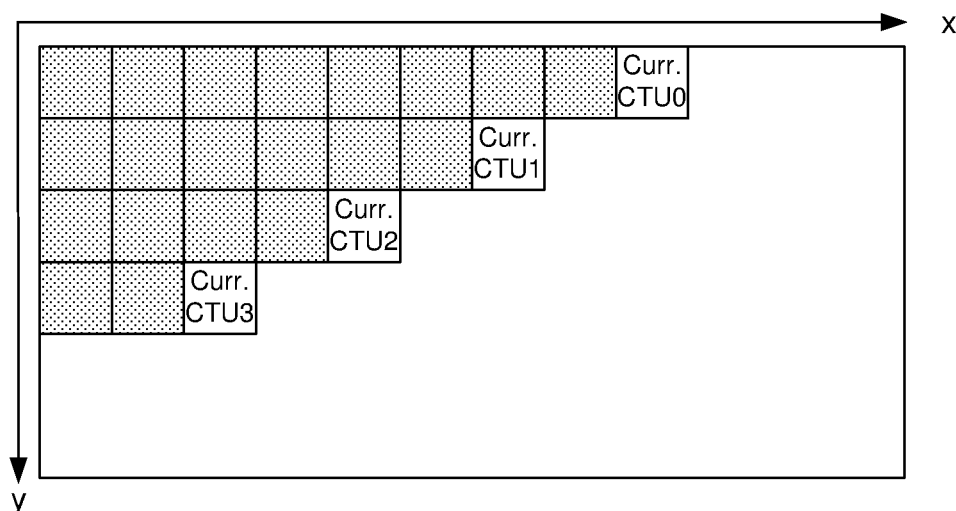
Figure 6C:
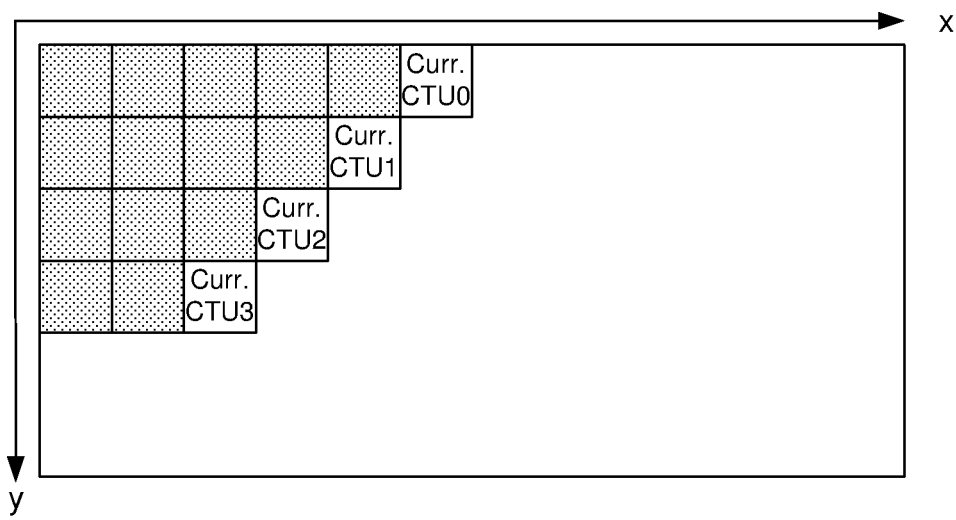

FIG. 6B illustrates an example corresponding to conditions a and b with N=2. FIG. 6C illustrates another example corresponding to conditions a and b with N=1.

In another embodiment, the reference area constraints with similar conditions are shown below.

$x\_ref < x\_cur$ and $y\_ref \leq y\_cur$, and     c.

$x\_cur \leq x\_ref \leq (x\_cur + N \times (y\_cur - y\_ref))$ and
$y\_ref < y\_cur$.     d.

Figure 6D:
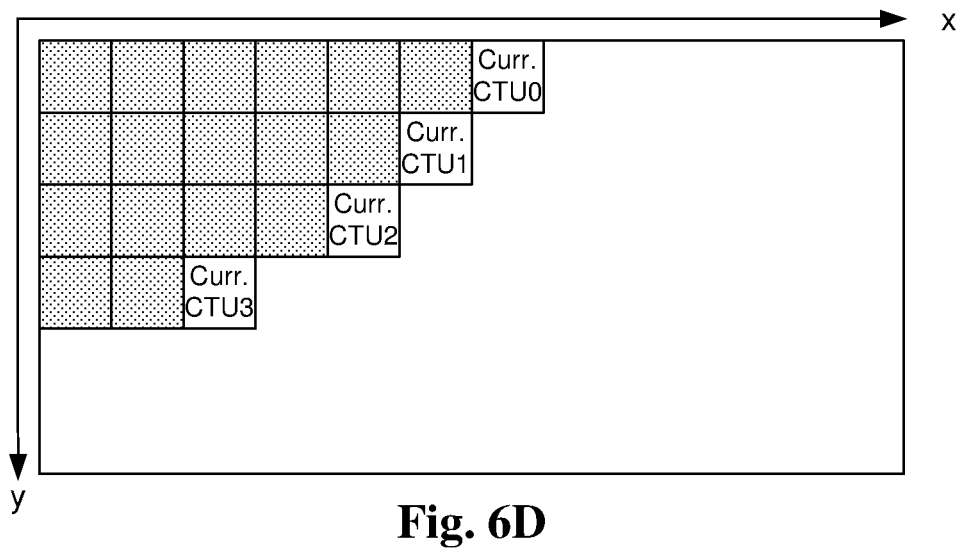

N can be any positive integer number greater than or equal to 1. FIG. 6D illustrates an example of the search and compensation range for "curr. CTU 3" according to conditions c and d with N=1.

In another embodiment, the search and compensation range of the current IntraBC coded block is restricted to the regions that satisfy one of the following conditions, $x\_ref < x\_cur$ and $y\_ref \leq y\_cur$, and     e.

$x\_cur \leq x\_ref < (x\_cur + N)$ and $y\_ref < y\_cur$.     f.

Figure 6E:
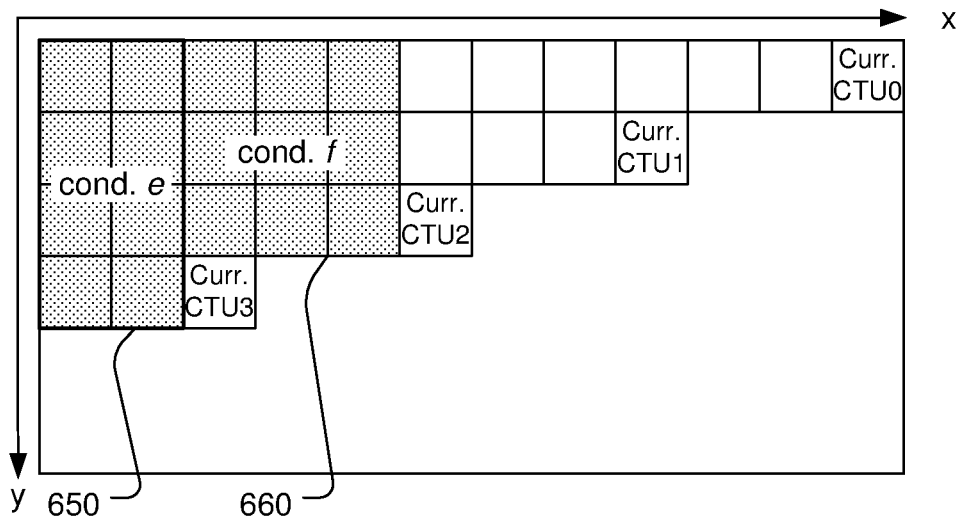

N can be any positive integer number greater than or equal to 1. FIG. 6E illustrates the search and compensation range (as shown by dot-filled regions) for "curr. CTU 3", where N is equal to 3. Condition e corresponds to the reference blocks shown as dot-filled area 650. Condition f corresponds to the reference blocks shown as dot-filled area 660. The constraints are applied to both encoder and decoder. It may also constrain the range of block vectors (BVs) since the information related to BVs may be signaled to indicate the location of the reference blocks.

Figure 6F:
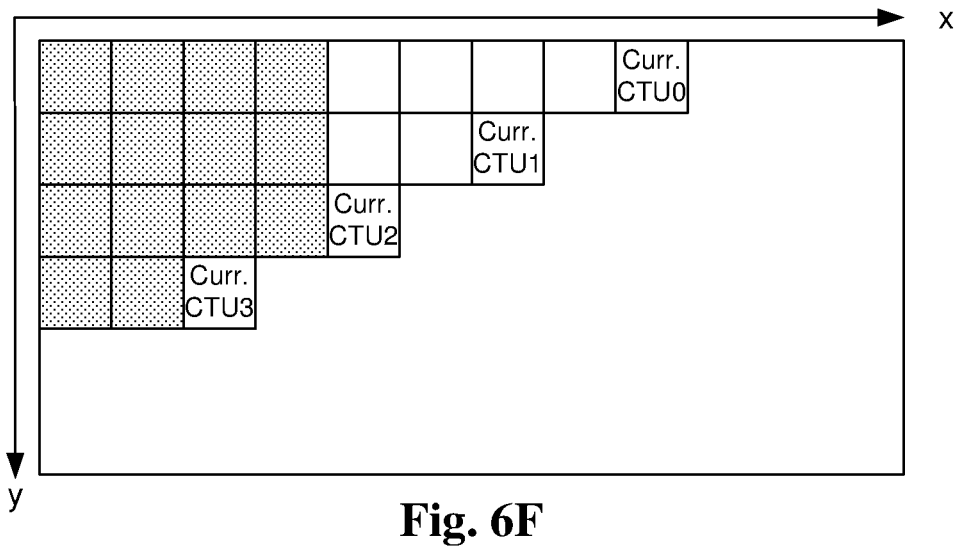

FIG. 6F illustrates an example corresponding to conditions e and f with N=1.

In yet another embodiment, any reference area smaller than the above defined ranges may be used. For example, the search and compensation range for the current IntraBC coded block can be restricted to one of the following conditions:

$(x\_cur - N) < x\_ref < x\_cur$ and $(y\_cur - M) < y\_ref \leq y\_cur$,
and     g.

Figure 7:
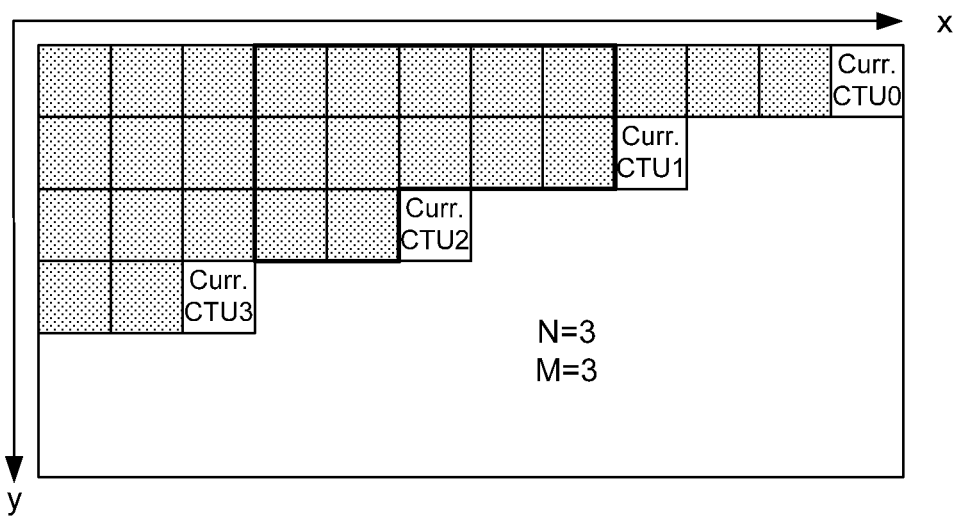
FIG. 7 illustrates another example of search and compensation ranges of the current IntraBC block restricted to the dot-filled areas.

$x\_cur \leq x\_ref < (x\_cur + N)$ and $(y\_cur - M) < y\_ref < y\_cur$,     h.

where N and M can be any non-negative number greater than or equal to 1. FIG. 7 illustrates an example according to conditions g and h with N=3 and M=3.

As shown in FIGS. 6A-6E and FIG. 7, the available reference area is restricted to a ladder-shaped area. In other words, one or more previously processed blocks before the current working block can be used as a reference block for IntraBC prediction. For any two neighboring previous CTU rows, the last previously processed block in an upper CTU row is always in a same vertical location or after a same vertical location of the last previously processed block in a lower CTU row. The last previously processed block of the CTU row above the current CTU row is always in a same vertical location or after a same vertical location of the current working block. In FIGS. 6A-6E and FIG. 7, the processing order for the CTU rows is from top to bottom. Therefore, a previous CTU row is above the current CTU row. Furthermore, the processing order for each CTU row is from left to right. Therefore, after a same vertical location of the last previously processed block means a block to the right side of the same vertical location of the last previously processed block. If the processing order is changed, the available reference area will be changed accordingly.

Furthermore, the ladder-shaped reference area for IntraBC prediction can also be applied to non-WPP configuration. Therefore, the picture doesn't necessarily have to be partitioned into multiple regions for parallel processing. The restriction of the reference block to the ladder-shaped reference area will reduce the search complexity compared to a full-frame search. However, it still can offer improved performance similar to the full-frame search.

Block Vector Constraints

Figure 8A:
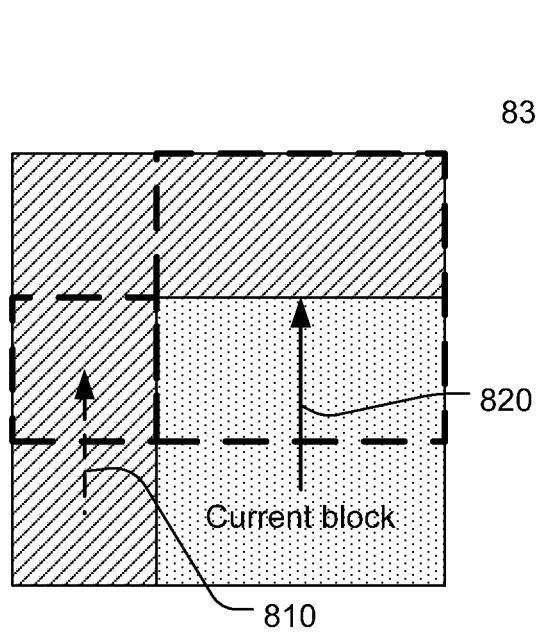
FIG. 8A-FIG. 8B illustrate examples where the block vector (BV) predictors may point to invalid reference blocks.
Figure 8B:
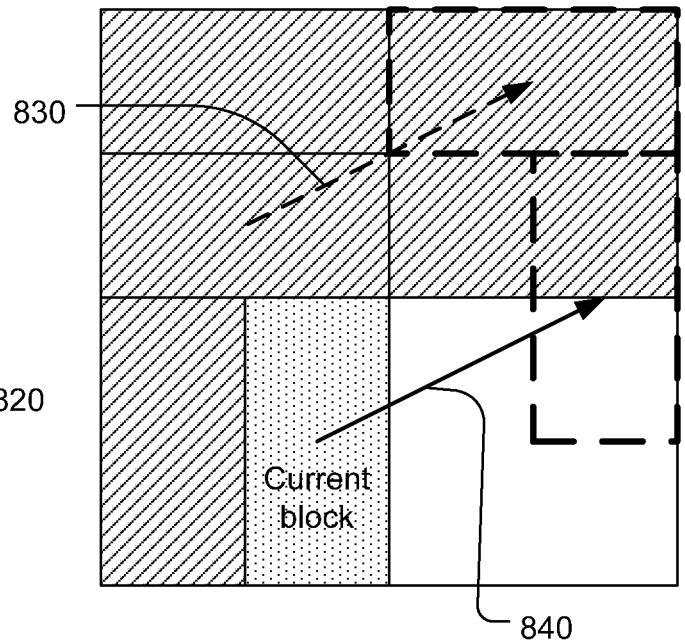

In order to avoid the issue that a block vector pointing to an invalid reference data area, a method of BV clipping is disclosed. In this invention, a clipping operation is applied to IntraBC block vector (BV) predictor and/or the BV of IntraBC Merge candidate. In the existing design, a block vector for an IntraBC coded block has some constraints. The BV can only point to an already reconstructed area within the current picture. In current screen content coding (SCC), the reconstructed area within the same coding unit cannot be used for IntraBC compensation. When a previously coded block vector is used as the predictor (either in normal IntraBC mode or IntraBC Merge/Skip mode), it may not be a valid vector for the current block. FIG. 8A and FIG. 8B illustrate two exemplary circumstances that invalid predictors may occur. The dashed arrows (810 and 830) represent the BVs for neighboring IntraBC coded blocks and the solid arrows (820 and 840) represent the BV predictors based on neighboring BVs for the current IntraBC blocks. The dashed rectangles or squares correspond to the reference blocks of the corresponding IntraBC blocks. In FIG. 8A and FIG. 8B, the block vector predictors are from the current block's spatial neighbors.

Therefore, some constraints need to be imposed on the block vector predictor so that it will be a valid block vector for the current IntraBC block. More specifically, the x-axis component and/or y-axis component of the block vector predictor should meet some requirements. In Table 1, two parameters Hoffset and Voffset are defined to describe such requirements.

TABLE 1

| Variable Definition | Pseudo code for definition |
| --- | --- |
| PartSize: the partition size of current block.<br>nPSW: current block width<br>nPSH: current block height<br>iPartIdx: partition index of current block<br>CU_size: the width or height of the CU that contains current block | switch ( PartSize )<br>{<br>case SIZE_2NxN:<br>    nPSW = CU_size;<br>    nPSH = CU_size >> 1;<br>    iHoffset = 0;<br>    iVoffset = (iPartIdx ==0)? 0 : nPSH;<br>    break;<br>case SIZE_Nx2N:<br>    nPSW = CU_size >> 1;<br>    nPSH = CU_size;<br>    iHoffset = (iPartIdx ==0)? 0 : nPSW;<br>    iVoffset = 0;<br>    break;<br>case SIZE_NxN:<br>    nPSW = CU_size >> 1;<br>    nPSH = CU_size >> 1; |

TABLE 1-continued

| Variable Definition | Pseudo code for definition |
| --- | --- |
| | iHoffset = (iPartIdx&0x1)*nPSW;<br>iVoffset = (iPartIdx>>1)*nPSH;<br>break;<br>case SIZE_2Nx2N:<br>    nPSW = CU_size;<br>    nPSH = CU_size;<br>    iHoffset = 0;<br>    iVoffset = 0;<br>    break;<br>} |

Assume that the BV predictor for the current block is BV=(BV_x, BV_y) and a clipped version of BV is BV'=(BV_x', BV_y'). The following examples disclose various cases for the clipping operation.

Case 1: if both components of the block vector BV are smaller or equal to 0 before clipping, then when both BV_x>−Hoffset and BV_y>−Voffset are true, a clipping operation is required.

When clipping is needed for Case 1, BV_x'=−Hoffset (and BV_y'=BV_y) can be used as the clipping operation according to one embodiment. In another embodiment, BV_y'=−Voffset (and BV_x'=BV_x), is used as the clipping operation in this case. In yet another embodiment, when BV_x+Hoffset is smaller than (or equal to) BV_y+Voffset, BV_x'=−Hoffset (and BV_y'=BV_y) is used as the clipping operation; otherwise, BV_y'=−Voffset (and BV_x'=BV_x) is used as the clipping operation in this case.

Case 2: if BV_x is greater than 0 before clipping, then when BV_y>−Voffset is true, a clipping operation is required.

When clipping is needed for Case 2, BV_y'=−Voffset (and BV_x'=BV_x) can be used as the clipping operation according to one embodiment in this case. In another embodiment, BV_y'=−Voffset (and BV_x'=0) is used as the clipping operation in this case.

Case 3: if BV_y is greater than 0 before clipping, then when BV_x>−Hoffset is true, a clipping operation is required.

When clipping is needed for Case 3, BV_x'=−Hoffset (and BV_y'=BV_y) can be used as the clipping operation according to one embodiment in this case. In another embodiment, BV_x'=−Hoffset (and BV_y'=0) is used as the proposed clipping operation in this case.

Block Vector Constraints for Slice/Tile-Based Parallel Processing

In the slice/tile-based process, one picture is divided into multiple slices or tiles. In order to achieve the parallel processing, each slice or tile should be able to be decoded independently. However, the full-frame IntraBC mode introduces the data dependency between the current CU and previously coded CUs, which implies that the data dependency will cross slice or tile boundaries and prohibits parallel processing. Therefore, the present invention imposes a constraint on available reference area for the full-frame IntraBC mode. In particular, the available reference area for the full-frame IntraBC mode is restricted to the area of the slice or tile that the current CU belongs to. By using this constraint, the data dependency between different slices or tiles introduced by the full-frame IBC mode can be removed. Therefore, only the data dependency between the current CU and previously coded CUs in the same slice or tile exists. The constraint is applied in the encoder side and the decoder side. In the encoder side, the search and compensation range of current IntraBC block is restricted to the current slice or tile. In decoder side, if the compensation range of current IntraBC block is not inside the current slice or tile, the bitstream is not a conformance bitstream.

Figures 9, 10:
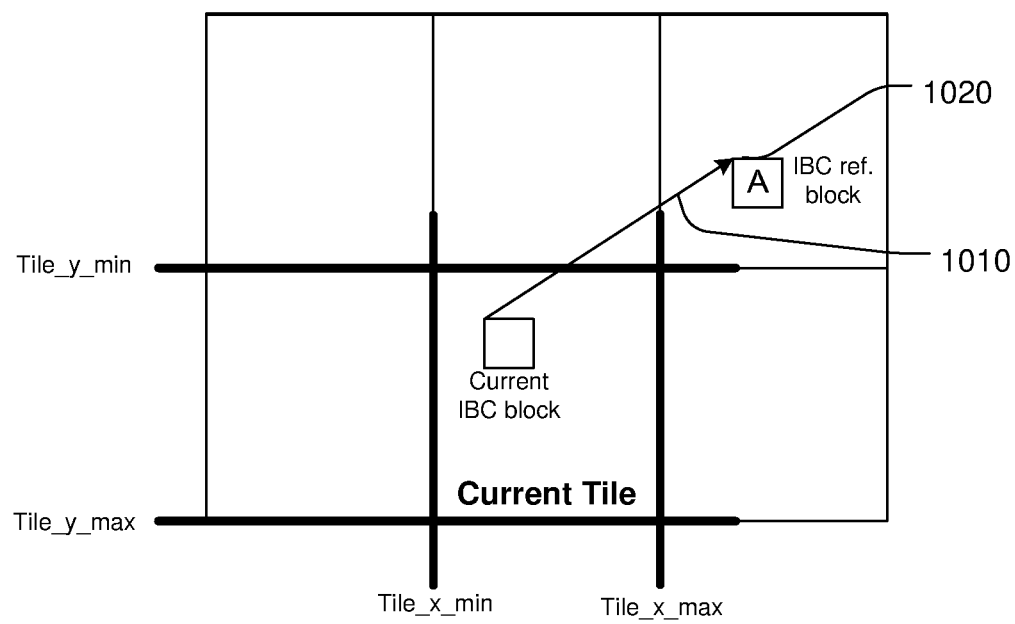
FIG. 9 illustrates an example of tile-based parallel processing for IntraBC mode coding, where the picture is partitioned into multiple tiles and each tile consists of multiple coding tree units (CTUs).
FIG. 10 illustrates an example of block vector (BV) associated with an invalid reference block in tile-based parallel processing using the IntraBC mode coding.

For example, a picture is partitioned into CTUs and the CTUs in the picture are divided into tiles as shown in FIG. 9. Each square with a numerical number corresponds to a CTU in the scanning order. The thick lines correspond to the tile boundaries. According to this embodiment, the dependency is broken at the tile boundary. Therefore, encoder and decoder must impose constraints such that the reference data for the current IntraBC coded block comes from the current tile. For example, the reference blocks for the current IntraBC coded CTU 46 correspond to previously coded CTUs 41, 42, 43, 44 and 45 within the same tile. When constraints are imposed on the BV or clipping is applied to the BV, the BV range is reduced and/or some redundancy is introduced, the BV coding can take this into consideration to improve coding efficiency.

In the multi-slice or a multiple-tile IntraBC coding, a compensation block (i.e., a reference block) for the current IntraBC coded block may not be entirely inside the current slice or tile. FIG. 10 illustrates an example that a BV (1010) of a current IntraBC (IBC) coded block points to a reference block A (1020) in another tile and this will prohibit parallel tile-based IntraBC process. The tile boundaries are shown in thick lines.

Figure 11:
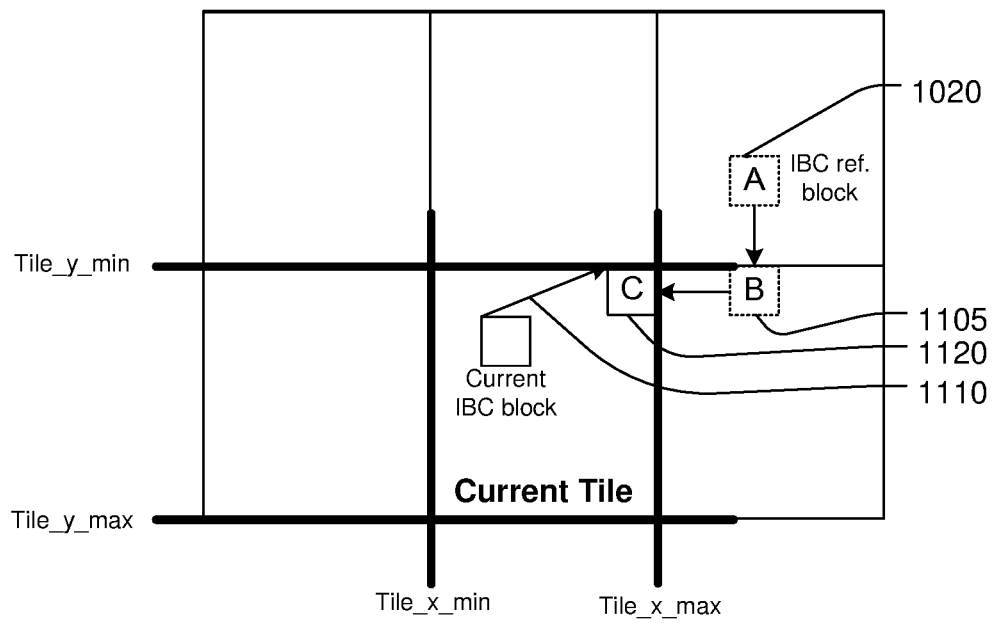
FIG. 11 illustrates an example of block vector (BV) clipping for tile-based parallel processing using the IntraBC mode coding, where the clipping process is applied to the vertical component first and then the horizontal component.

In one embodiment, the BV is clipped to a valid BV for the current IntraBC block. Two different clipping processes may be used. According to the first clipping process, the vertical BV is clipped first so that the location corresponding to the top of the reference block (1020) cannot be smaller than Tile_y_min and the location corresponding to the bottom of the reference block cannot be larger than Tile_y_max (in this embodiment, Tile_y_min is smaller than Tile_y_max). Then, the horizontal BV is clipped so that the left of the reference block (1020) cannot be smaller than Tile_x_min and the right of the reference block (1020) cannot be larger than Tile_x_max (in this embodiment, Tile_x_min is smaller than Tile_x_max). FIG. 11 illustrates the clipping process for the example of the reference block in FIG. 10. After the vertical clipping, the reference block A (1020) is moved down to location B (1105). After the horizontal clipping, the new location C (1120) within the current tile is identified. The corresponding clipped BV (1110) is also indicated in FIG. 11.

Figure 12:
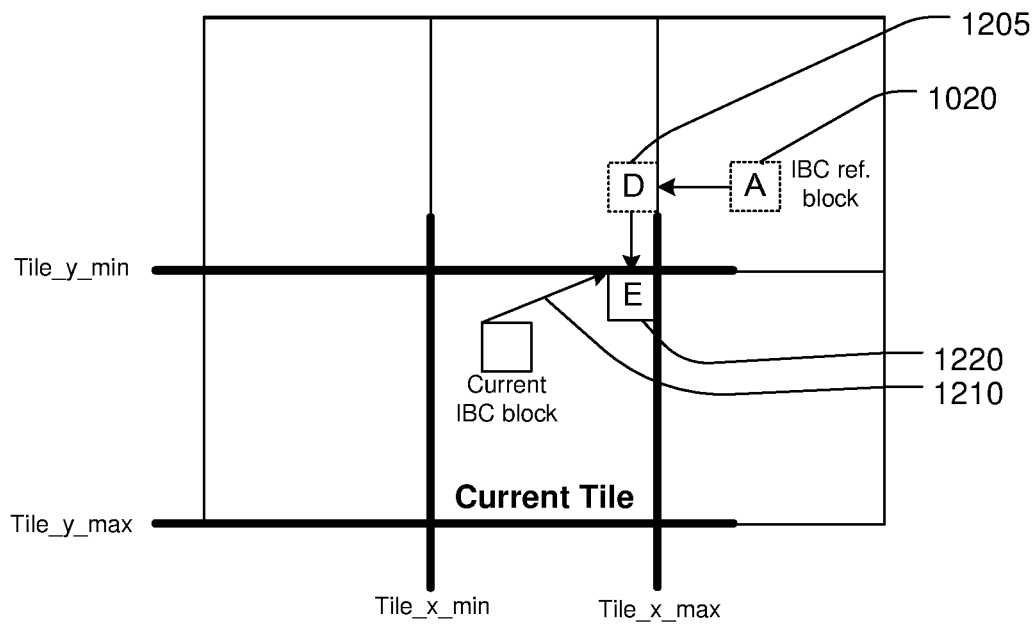
FIG. 12 illustrates an example of block vector (BV) clipping for tile-based parallel processing using the IntraBC mode coding, where the clipping process is applied to the horizontal component first and then the vertical component.

The second clipping process performs the horizontal clipping first and then the vertical clipping. The horizontal BV is clipped so that the location corresponding to the left of the reference block cannot be smaller than Tile_x_min and the location corresponding to the right of the reference block cannot be larger than Tile_x_max. Then, the vertical BV is clipped so that the top of the reference block cannot be smaller than Tile_y_min and the bottom of the reference block cannot be larger than Tile_y_max. FIG. 12 illustrates the clipping process for the example of the reference block in FIG. 10. After the horizontal clipping, the reference block A (1020) is moved left to location D (1205). After the vertical clipping, the new location E (1120) within in the current tile is identified. The corresponding clipped BV (1210) is also indicated in FIG. 12.

Figure 13:
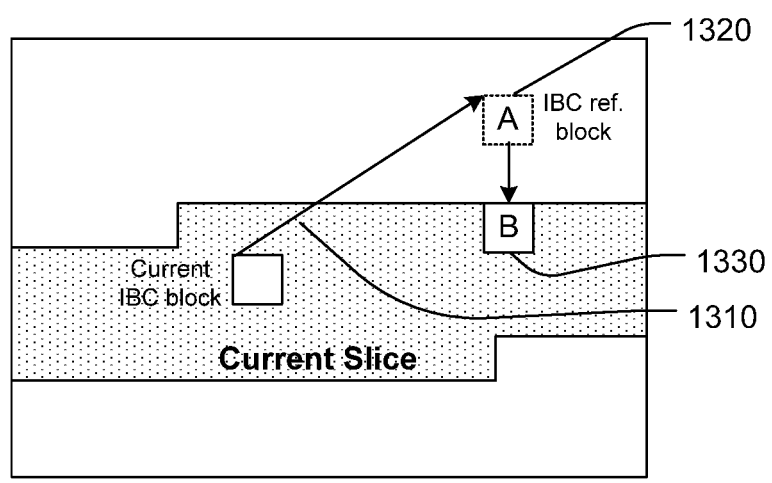
FIG. 13 illustrates an example of block vector (BV) clipping for slice-based parallel processing using the IntraBC mode coding, where the clipping process is applied to the vertical component.

The clipping process can also be applied to slice-based parallel processing. FIG. 13 illustrates an example of the clipping process in slice-based parallel processing. The current picture is divided into multiple slices. If the BV (1310) of the current IntraBC coded block points to a reference block A (1320) outside the current slice, the BV needs to be clipped so that the clipped BV will point to a valid reference block. After the vertical clipping, the reference block A (1320) is moved to block location B (1330). The block B is the final clipped reference block since the block is within the current slice.

IntraBC Compensation for Non-Available Area

Even if the BV clipping is applied, the decoder may still have a decoded BV pointing to a non-available area in multiple slice/tile IntraBC process. The decoder behavior regarding how to compensate the IntraBC block is undefined when a decoded BV points to a non-available area. In order to avoid the potential problem at a decoder due to an invalid BV, embodiments of the present invention disclose various processes to solve the potential problem of invalid BV.

1. Processing for Non-Available Area: Padding

If the IntraBC reference block is overlapped with the non-available area, the samples in the non-available area are padded by using the neighboring available pixels. Then the padded samples are used for IntraBC compensation.

2. Processing for Non-Available Area: Using a Predefined Value

If the IntraBC reference block is overlapped with the non-available area, the samples in the non-available area are set to a predefined value, e.g. 128. According to another implementation, the pixel value of the current reconstructed picture is set to a predefined value (e.g. 128) before encoding/decoding. After a block is coded and reconstructed, the reconstructed texture is filled into this picture. If the IntraBC reference block is overlapped with the non-available area, the preset pixel values can be used.

3. Processing for Non-Available Area: Using a Predefined Value for All Pixels in the Unavailable Area If the IntraBC reference block is overlapped with the non-available area, the samples in the unavailable area are set to a predefined value, e.g. 128.

4. Processing for Non-Available Area: Using Inter Reference Block as Predictors

If the current block is in an Inter-slice and the IntraBC reference block is overlapped with the non-available area, the non-available area of the reference block or the entire reference block can refer to the collocated block of the current block in one of the reference frames. For example, if the picture with refIdx equal to 0 in LIST_0, the block with the same position to the current block can be used as IntraBC predictors.

According to another embodiment, if the current block is in an Inter-slice and the IntraBC reference block is overlapped with the non-available area, the non-available area of the reference block or the entire reference block can refer to the collocated block of the IntraBC reference block in one of the reference frames. For example, if the picture with refIdx equal to 0 in LIST_0, the block with the same position to the IntraBC reference block can be used as IntraBC predictors.

5. Processing for Non-Available Area: Using One of a Set of Predefined Values

According to another embodiment, multiple major colors can be signaled in a level higher than the block level. For example, in slice header, the parameter N representing the number of major colors can be signaled, where N is a positive integer. After the parameter N is signaled, N pixel values corresponding to the N major colors are signaled. If the IntraBC reference block is overlapped with the non-available area, the textures in the non-available area are set to be one of the predefined major color values signaled in the slice header. Furthermore, the selection of the color used in the overlapped area can be signaled by an index for the list of major colors in the slice header. The multiple major colors may also be signaled in a picture level or a sequence level.

According to yet another implementation, if the IntraBC reference block is overlapped with the non-available area, the entire block will use one of the major colors signaled in the slice header.

The performance for a system incorporating embodiments of the present invention is compared to an anchor system based on SCM 2.0. The comparisons are performed under three different coding configurations including all-Intra mode, random access mode and low-delay B picture mode for various test images. Embodiments according to the present invention impose constraints on the available reference area while the SCM 2.0 anchor system allows full-frame IntraBC reference area. In the first comparison, the embodiment is based on the available reference area constraint FIG. 6B. The performance is measured in terms of BD-rate, which is well-known performance measure in the field. The performance of the embodiment based on FIG. 6B is slightly worse than the anchor system. The BD-rate is up to 2.2% worse than the anchor system. The performance of the embodiment based on FIG. 6E is slightly worse than the anchor system. The BD-rate is up to 2.9% worse than the anchor system.

Figure 14:
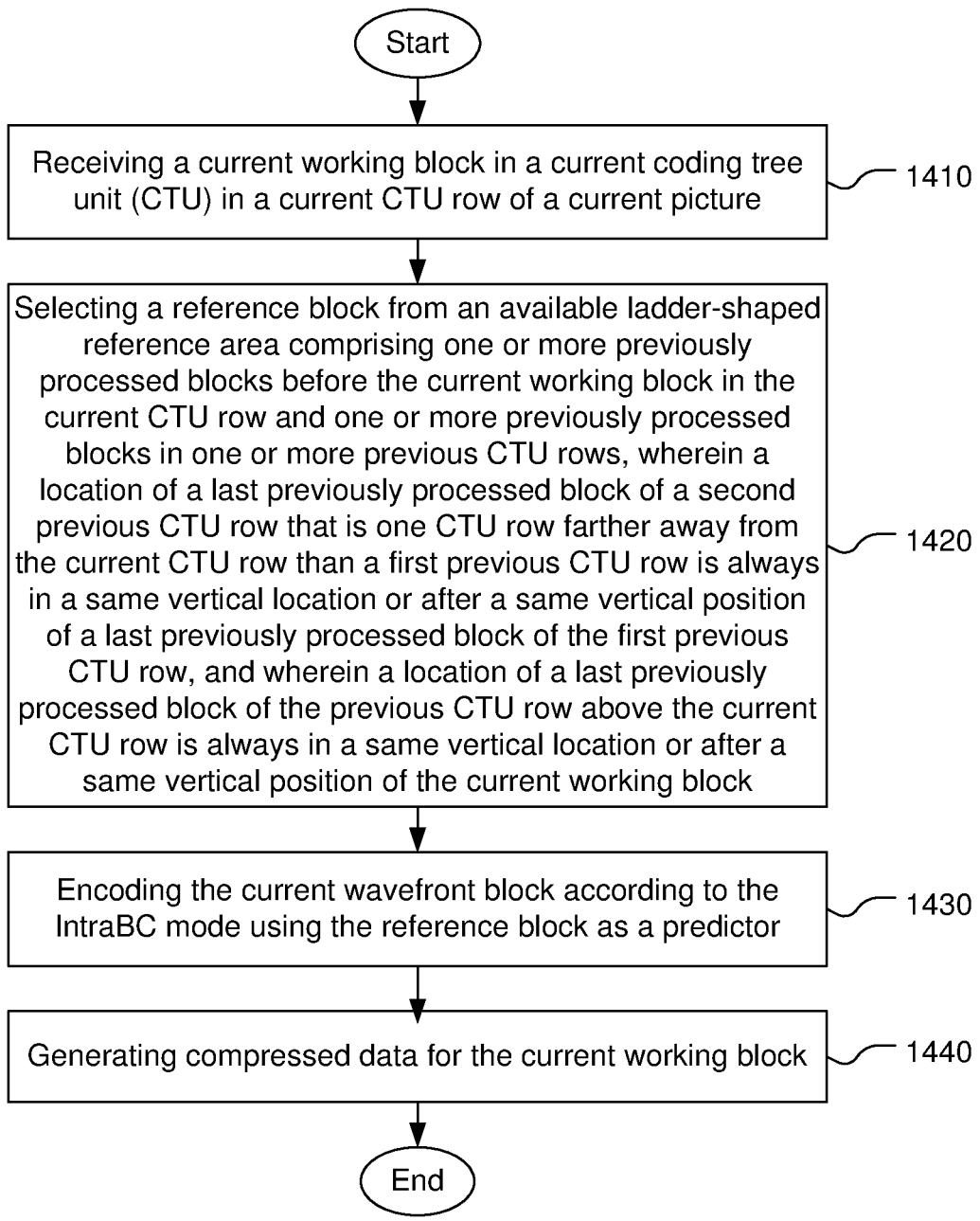
FIG. 14 illustrates an exemplary flowchart of IntraBC coding for a video encoder incorporating a restricted search range area according to an embodiment of the present invention.

FIG. 14 illustrates an exemplary flowchart of IntraBC coding for a video encoder incorporating a restricted search range area according to an embodiment of the present invention. A current working block in a current coding tree unit (CTU) in a current CTU row of a current picture is received in step 1410. The current working block may be retrieved from memory (e.g., computer memory, buffer (RAM or DRAM) or other media) or from a processor. A reference block is selected from a available ladder-shaped reference area comprising one or more previously processed blocks before the current working block in the current CTU row and one or more previously processed blocks in one or more previous CTU rows as shown in step 1420. A location of a last previously processed block of a second previous CTU row that is one CTU row farther away from the current CTU row than a first previous CTU row is always in a same vertical location or after a same vertical position of a last previously processed block of the first previous CTU row. A location of a last previously processed block of the previous CTU row above the current CTU row is always in a same vertical location or after a same vertical position of the current working block. The current working block is then encoded according to the IntraBC mode using the reference block as a predictor in step 1430. Compressed data for the current working block in step 1440.

Figure 15:
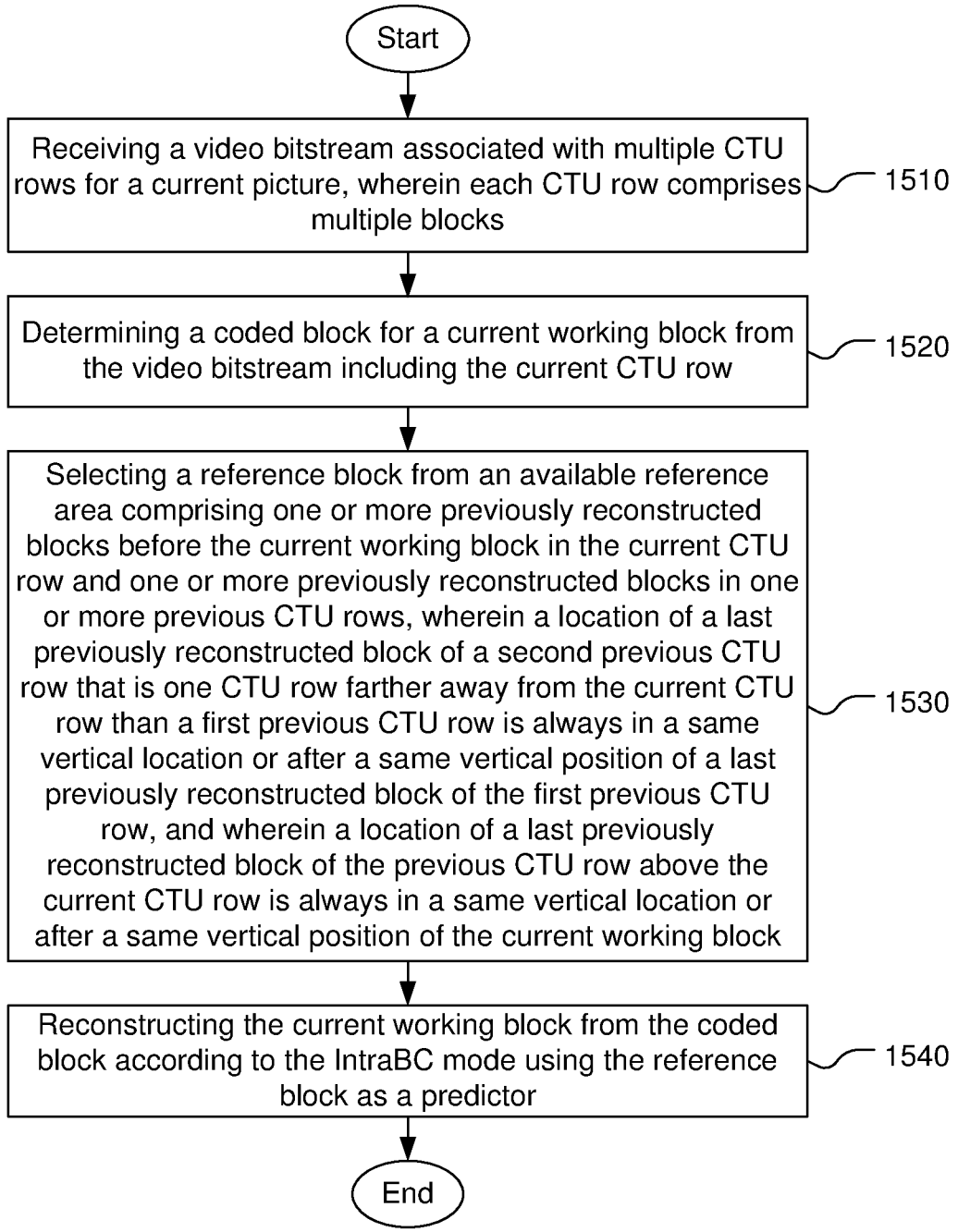
FIG. 15 illustrates an exemplary flowchart of IntraBC coding for a video decoder incorporating a restricted search range area according to an embodiment of the present invention.

FIG. 15 illustrates an exemplary flowchart of IntraBC coding for a video decoder incorporating a restricted search range area according to an embodiment of the present invention. A video bitstream associated with multiple CTU rows for a current picture is received in step 1510, where each CTU row comprises multiple blocks. Video bitstream may be retrieved from memory (e.g., computer memory, buffer (RAM or DRAM) or other media) or from a processor. A coded block for the current working block is determined from the video bitstream including the current CTU row in step 1520. An available ladder-shaped reference area comprising one or more previously reconstructed blocks before the current working block in the current CTU row and one or more previously reconstructed blocks in one or more previous CTU rows in step 1530. A location of a last previously processed block of a second previous CTU row that is one CTU row farther away from the current CTU row than a first previous CTU row is always in a same vertical location or after a same vertical position of a last previously processed block of the first previous CTU row. A location of a last previously processed block of the previous CTU row above the current CTU row is always in a same vertical location or after a same vertical position of the current working block. The current working block is reconstructed from the coded block according to the IntraBC mode using the reference block as a predictor in step 1540.

Figure 16:
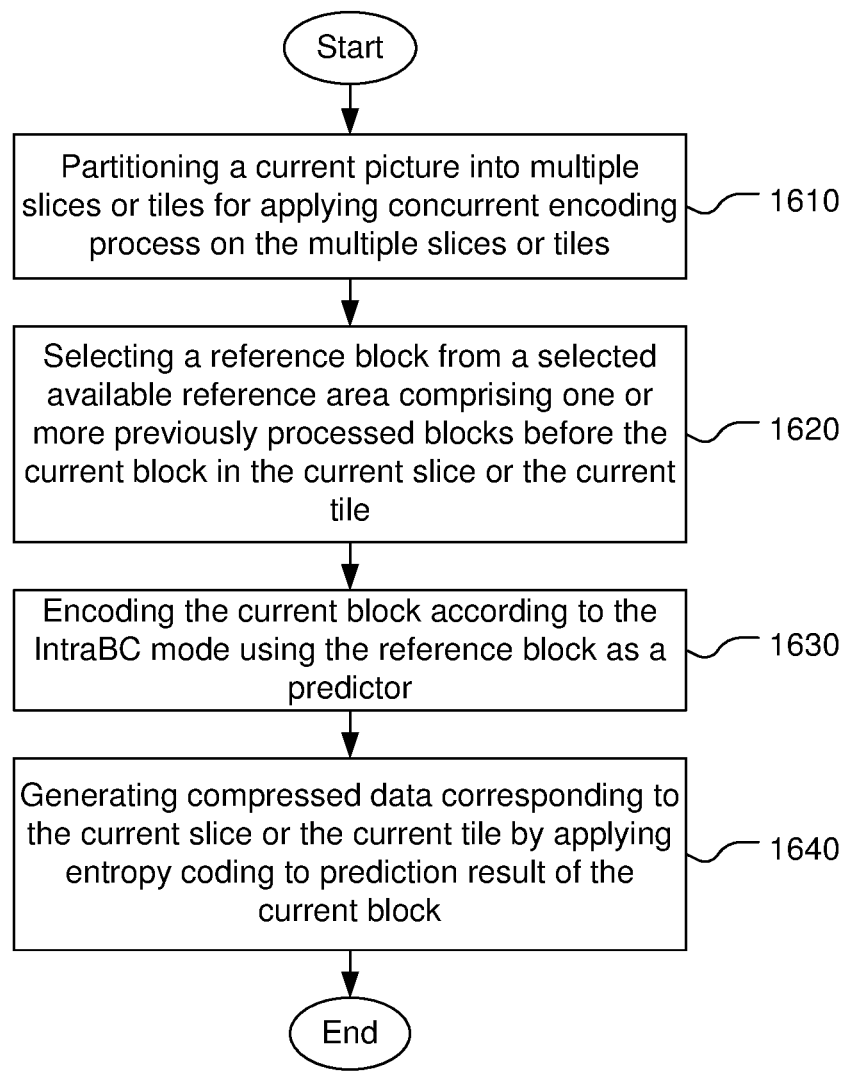
FIG. 16 illustrates an exemplary flowchart of IntraBC coding for a video encoder with slice/tile-based parallel processing incorporating a restricted search range area according to an embodiment of the present invention.

FIG. 16 illustrates an exemplary flowchart of IntraBC coding for a video encoder with slice/tile-based parallel processing incorporating a restricted search range area according to an embodiment of the present invention. A current picture is partitioned into multiple slices or tiles for applying concurrent encoding process on the multiple slices or tiles in step 1610. The encoding process is illustrated for the case that the current block is coded in the IntraBC mode. A reference block is selected from a selected available reference area comprising one or more previously processed blocks before the current block in the current slice or the current tile in step 1620. The current block is encoded according to the IntraBC mode using the reference block as a predictor in step 1630. Compressed data corresponding to the current slice or the current tile is generated by applying entropy coding to prediction result of the current block in step 1640.

Figure 17:
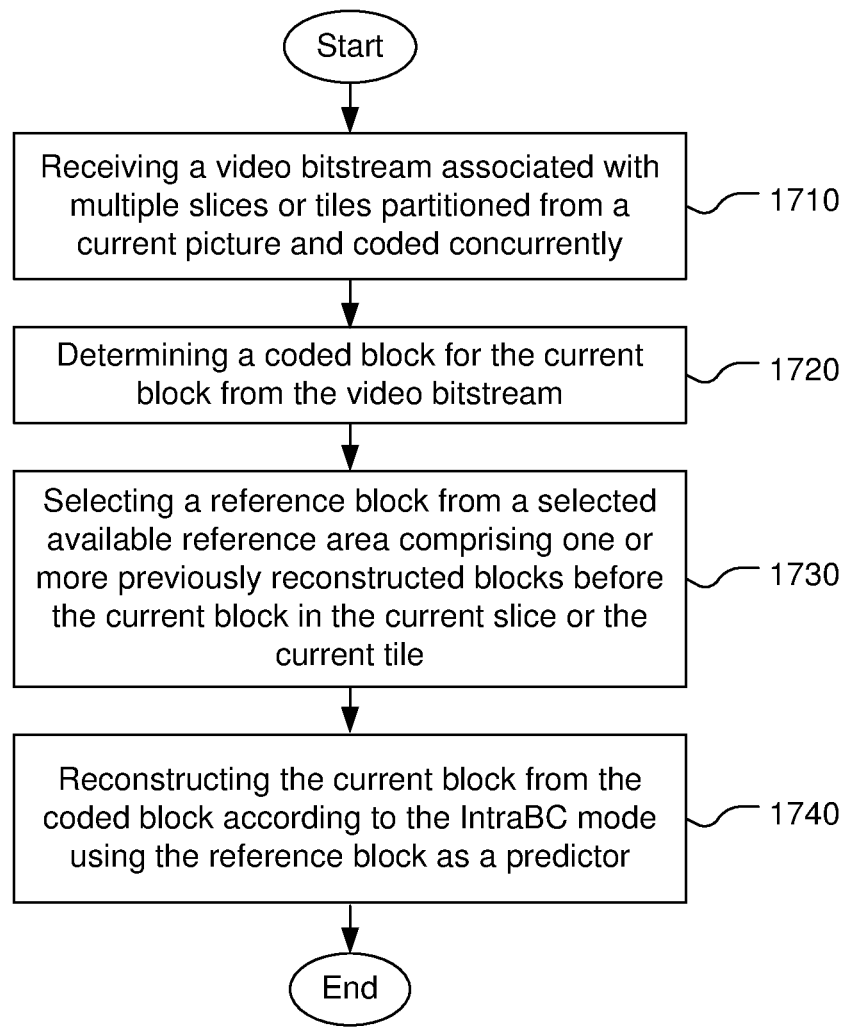
FIG. 17 illustrates an exemplary flowchart of IntraBC coding for a video decoder with slice/tile-based parallel processing incorporating a restricted search range area according to an embodiment of the present invention.

FIG. 17 illustrates an exemplary flowchart of IntraBC coding for a video decoder with slice/tile-based parallel processing incorporating a restricted search range area according to an embodiment of the present invention. A video bitstream associated with multiple slices or tiles partitioned from a current picture and coded concurrently is received in step 1710. The decoding process is illustrated for the case that the current block is coded in the IntraBC mode. A coded block for the current block is determined from the video bitstream in step 1720. A reference block is selected from a selected available reference area comprising one or more previously reconstructed blocks before the current block in the current slice or the current tile in step 1730. The current block is reconstructed from the coded block according to the IntraBC mode using the reference block as a predictor in step 1740.

The flowcharts shown above are intended to illustrate examples of IntraBC coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding using IntraBC mode (Intra-block copy mode) coding for a picture, the method comprising:

receiving a current working block in a current coding tree unit (CTU) in a current CTU row of a current picture;

selecting a reference block from an available ladder-shaped reference area comprising one or more previously processed blocks before the current working block in the current CTU row and one or more previously processed blocks in at least a first previous CTU row immediately above the current CTU row and a second previous CTU row above the first previous CTU row, wherein a CTU location of a last previously processed CTU of the second previous CTU row is always after a vertical position of a last previously processed CTU of the first previous CTU row, and wherein a CTU location of the last previously processed CTU of the first previous CTU row is always in a same vertical location or after the same vertical position of the current CTU;

encoding the current working block according to the IntraBC mode using the reference block as a predictor; and generating compressed data for the current working block, wherein the available ladder-shaped reference area for the current working block is identifiable, according to a CTU location of the current CTU (x_cur, y_cur) and a CTU location of a reference CTU (x_ref, y_ref) that includes the reference block, as a combination of:

$x\_ref < x\_cur$ and $y\_ref \leq y\_cur$; and $x\_cur \leq x\_ref \leq (x\_cur + N \times (y\_cur - y\_ref))$ and $y\_ref < y\_cur$, wherein N is an integer greater than or equal to one.

2. The method of claim 1, wherein a block location of the reference block relative to the current working block is signaled using a block vector (BV).

3. The method of claim 1, wherein said one or more previously processed blocks before the current working block in the current CTU row correspond to all previously processed blocks from a beginning previously processed block of the current CTU row to a last previously processed block before the current working block in the current CTU row.

4. The method of claim 3, wherein said one or more previously processed blocks in each previous CTU row include consecutive previously processed blocks from a beginning previously processed block of each previous CTU row.

5. The method of claim 1, wherein N is equal to one.

6. The method of claim 1, wherein the current picture is partitioned into multiple CTU rows for applying wavefront parallel processing (WPP) on the multiple CTU rows, wherein the current working block corresponds to a current wavefront block, each previous wavefront block is identified for each previous CTU row, and said one or more previously processed blocks in each CTU row are processed before each previous wavefront block in each CTU row.

7. The method of claim 6, wherein a current WPP sub-bitstream is generated for the current CTU row.

8. A method of video decoding using IntraBC mode (Intra-block copy mode) coding for a picture, the method comprising:

receiving a video bitstream associated with multiple coding tree unit (CTU) rows for a current picture, wherein each CTU row comprises multiple blocks; and determining a coded block for a current working block from the video bitstream including a current CTU row;

selecting a reference block from an available ladder-shaped reference area comprising one or more previously reconstructed blocks before the current working block in the current CTU row and one or more previously reconstructed blocks in at least a first previous CTU row immediately above the current CTU row and a second previous CTU row above the first previous CTU row, wherein a CTU location of a last previously reconstructed CTU of the second previous CTU row is always after a vertical position of a last previously reconstructed CTU of the first previous CTU row, and wherein a CTU location of the last previously reconstructed CTU of the first previous CTU row is always in a same vertical location or after the same vertical position of the current CTU; and reconstructing the current working block from the coded block according to the IntraBC mode using the reference block as a predictor, wherein the available ladder-shaped reference area for the current working block is identifiable, according to a CTU location of the current CTU (x_cur, y_cur) and a CTU location of a reference CTU (x_ref, y_ref) that includes the reference block, as a combination of:

$x\_ref < x\_cur$ and $y\_ref \leq y\_cur$; and $x\_cur \leq x\_ref \leq (x\_cur + N \times (y\_cur\ y\_ref))$ and $y\_ref < y\_cur$;

wherein N is an integer greater than or equal to one.

9. The method of claim 8, wherein a block location of the reference block relative to the current working block is determined according to a block vector (BV).

10. The method of claim 8, wherein said one or more previously reconstructed blocks before the current working block in the current CTU row correspond to all previously processed blocks from a beginning previously reconstructed block of the current CTU row to a last previously reconstructed block before the current working block in the current CTU row.

11. The method of claim 10, wherein said one or more previously reconstructed blocks in each previous CTU row include consecutive previously reconstructed blocks from a beginning previously reconstructed block of each previous CTU row.

12. The method of claim 8, wherein N is equal to one.

13. The method of claim 8, wherein the current picture is partitioned into multiple CTU rows for applying wavefront parallel processing (WPP) on the multiple CTU rows, and wherein the video bitstream associated with the multiple CTU rows corresponds to multiple WPP sub-bitstreams and each WPP sub-bitstream is associated with each CTU row.

14. The method of claim 13, wherein the current working block corresponds to a current wavefront block of the WPP, each previous wavefront block of the WPP is identified for each previous CTU row, and said one or more previously reconstructed blocks in each CTU row are reconstructed before each previous wavefront block in each CTU row.

* * * * *